G. H. MERWIN.
LUBRICATING TROLLEY.
APPLICATION FILED MAY 18, 1911.
1,037,507.
Patented Sept. 3, 1912.
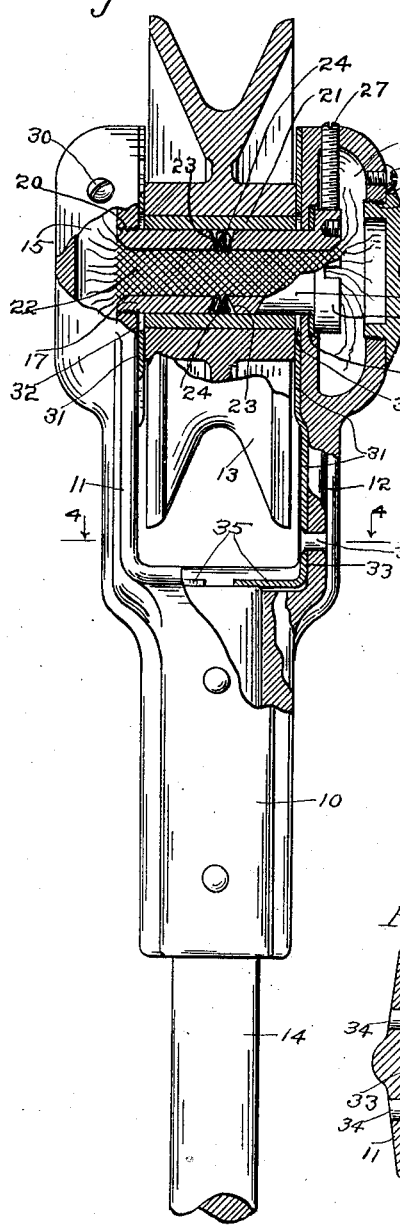
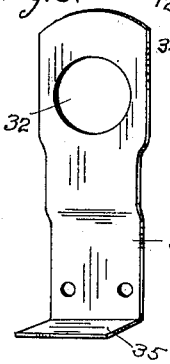
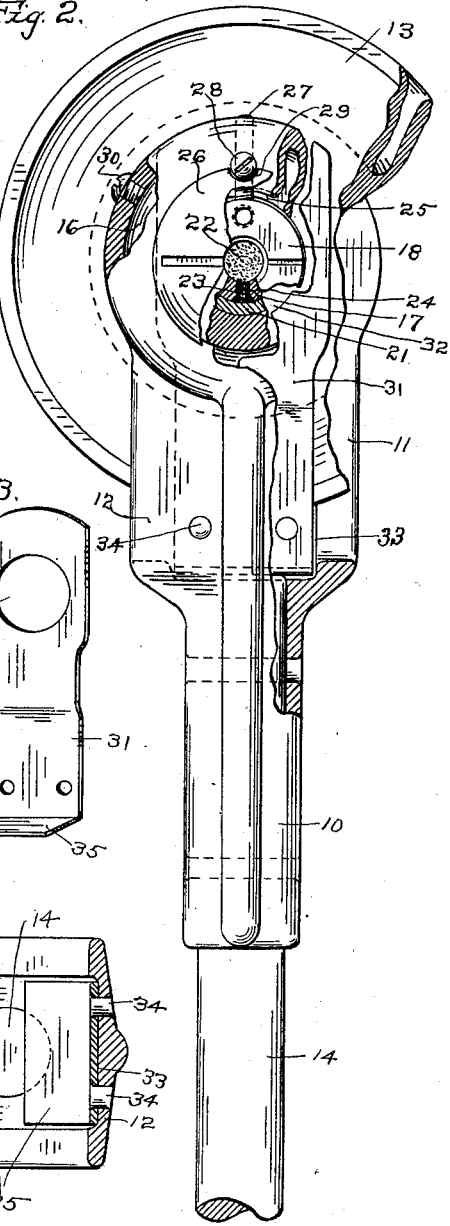
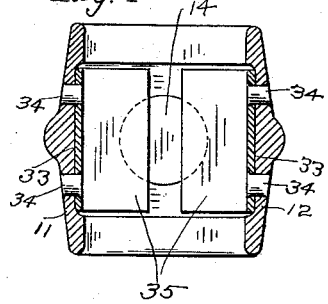
WITNESSES:
INVENTOR
George H. Merwin
BY
ATTORNEY

UNITED STATES PATENT OFFICE.

GEORGE H. MERWIN, OF MILFORD, CONNECTICUT.

LUBRICATING-TROLLEY.

1,037,507.   Specification of Letters Patent.   Patented Sept. 3, 1912.

Application filed May 18, 1911. Serial No. 628,057.

*To all whom it may concern:*

Be it known that I, GEORGE H. MERWIN, a citizen of the United States, residing at Milford, county of New Haven, State of Connecticut, have invented an Improvement in Lubricating-Trolleys, of which the following is a specification.

This invention has for its object to provide a simple and inexpensive self-oiling trolley head which shall be neat and attractive in appearance and especially adapted for long-continued use without repairs and with no attention whatever.

With these and other objects in view I have devised the novel trolley head, or as it is variously termed "fork" or "harp," of which the following description in connection with the accompanying drawing is a specification, reference characters being used to indicate the several parts.

Figure 1 is an elevation partly in longitudinal section of my novel trolley head as in use; Fig. 2 an elevation partly broken away as seen from the right in Fig. 1; Fig. 3 a perspective of one of the springs detached; and Fig. 4 is a transverse section on the line 4—4 in Fig. 1, looking in the direction of the arrows.

10 denotes the shank and 11 and 12 the arms of my novel trolley head, which are cast in a single piece.

13 denotes the trolley wheel and 14 the pole to which the shank is riveted or otherwise rigidly secured.

The arms each have formed integral therewith oil reservoirs 15 and 16, one of which has an opening in both its inner and outer walls, the other having an opening in its inner wall and its outer wall being closed. These reservoirs are connected by a hollow bearing 17 having oil holes 23 and provided at one end with a head 18 which bears upon the inner wall of reservoir 16 or upon a packing washer 19 interposed between the wall and the head. The other end of said bearing is threaded and engages a threaded hole 20 in the inner wall of reservoir 15. The trolley wheel is shown as provided with the usual bushing 21 and is mounted to rotate on the hollow bearing. The trolley wheel is lubricated from the oil reservoirs by means of a wick 22 which extends through the hollow bearing and the ends of which lie in the oil reservoirs, the oil passing from the wick through holes 23 in the hollow bearing. In order to assist in the lubrication of the trolley wheels, strands 24 of the wick are preferably pulled up through holes 23 and into contact with the bushing. For the purpose of assembling, reservoir 16 is provided in its outer wall with a threaded hole 25, larger than the head of the hollow bearing, which is closed by a screw cap 26. The hollow bearing is locked in place after being set up by a set screw 27 which engages the head thereof, and the screw cap is locked in place by a screw 28 the head of which lies in a recess 29 in the head of the screw cap. The reservoirs are filled independently through holes closed by screw plugs 30.

An important feature of the present invention consists of conducting springs 31 having holes 32 through which the hollow bearing passes without contact and which take the current from the trolley wheel and conduct it to the pole. The upper ends of these springs press inward and bear upon the hub of the trolley wheel, retaining it against lateral movement and taking up lost motion as wear of the parts takes place. Below their contact portion these springs are offset outward and lie in recesses 33 in the inner faces of the arms to which they are rigidly secured as by rivets 34. The lower ends of the springs are bent inward at an angle as at 35 and lie in close engagement with the end of the pole to which the current passes. By offsetting the springs and recessing them into the arms I prevent the possibility of the flange of the wheel from coming in contact with the springs.

Having thus described my invention I claim:

1. A holder comprising arms having oil reservoirs, one of said reservoirs having a closed outer wall and a threaded hole in its inner wall and the other having an unthreaded hole in its inner wall and a threaded hole in its outer wall and a hollow bearing having a head bearing against the inner wall of one reservoir, said bearing engaging the threaded hole in the other reservoir and removable through the hole in the outer wall.

2. A holder comprising arms having oil reservoirs, one of said reservoirs having a closed outer wall and a threaded hole in its inner wall and the other having an unthreaded hole in its inner wall and a hole in its outer wall, a hollow bearing having oil holes, a head bearing against the inner wall of one reservoir and a threaded end engaging the hole in the other reservoir and a wick in the bearing extending into both reservoirs.

3. A holder comprising arms having oil reservoirs, one of said reservoirs having a closed outer wall and a threaded hole in its inner wall and the other having an unthreaded hole in its inner wall and a hole in its outer wall, a hollow bearing extending between the reservoirs and having oil holes and a wick in the hollow bearing and extending into both reservoirs and having strands pulled into the oil holes, for the purpose set forth.

4. A holder comprising arms having oil reservoirs in their free ends, a bearing sleeve extending between the reservoirs and having a threaded connection at one end with the inner wall of one of said reservoirs, the other end of said sleeve being provided with a head bearing against the inner wall of the other reservoir, said sleeve being also provided with a side opening, a wick extending through said sleeve and having its ends extending into the reservoirs and having a side portion projecting through the side opening of the sleeve, and a wheel mounted on the sleeve.

5. A holder comprising arms having oil reservoirs in their free ends, a perforated bearing sleeve extending between said reservoirs and having a threaded connection at one end with the inner wall of one of said reservoirs, the other end of said sleeve being provided with a head bearing against the inner wall of the other reservoir, a wick extended through said bearing sleeve, and means engaging the periphery of said head to prevent movement of the sleeve.

In testimony whereof I affix my signature in presence of two witnesses.

GEORGE H. MERWIN.

Witnesses:
A. M. WOOSTER,
S. W. ATHERTON.

---

Copies of this patent may be obtained for five cents each, by addressing the "Commissioner of Patents Washington, D. C."